April 28, 1953  F. G. DE SANTIS ET AL  2,636,223
STOP MOTION FOR DRAWING FRAMES
Filed Aug. 26, 1950  9 Sheets-Sheet 1

INVENTORS
Fausto G. DeSantis
Ellis H. Wilcox
BY
W Russell Greenwood
THEIR ATTORNEY INVENTORS
Fausto G. DeSantis
Ellis H. Wilcox
BY
W Russell Greenwood
THEIR ATTORNEY

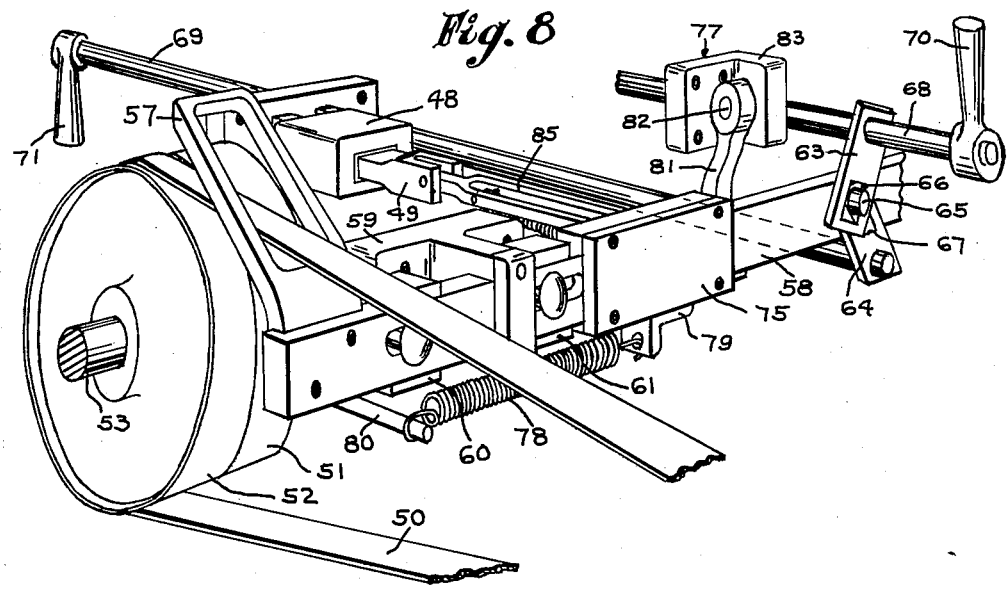

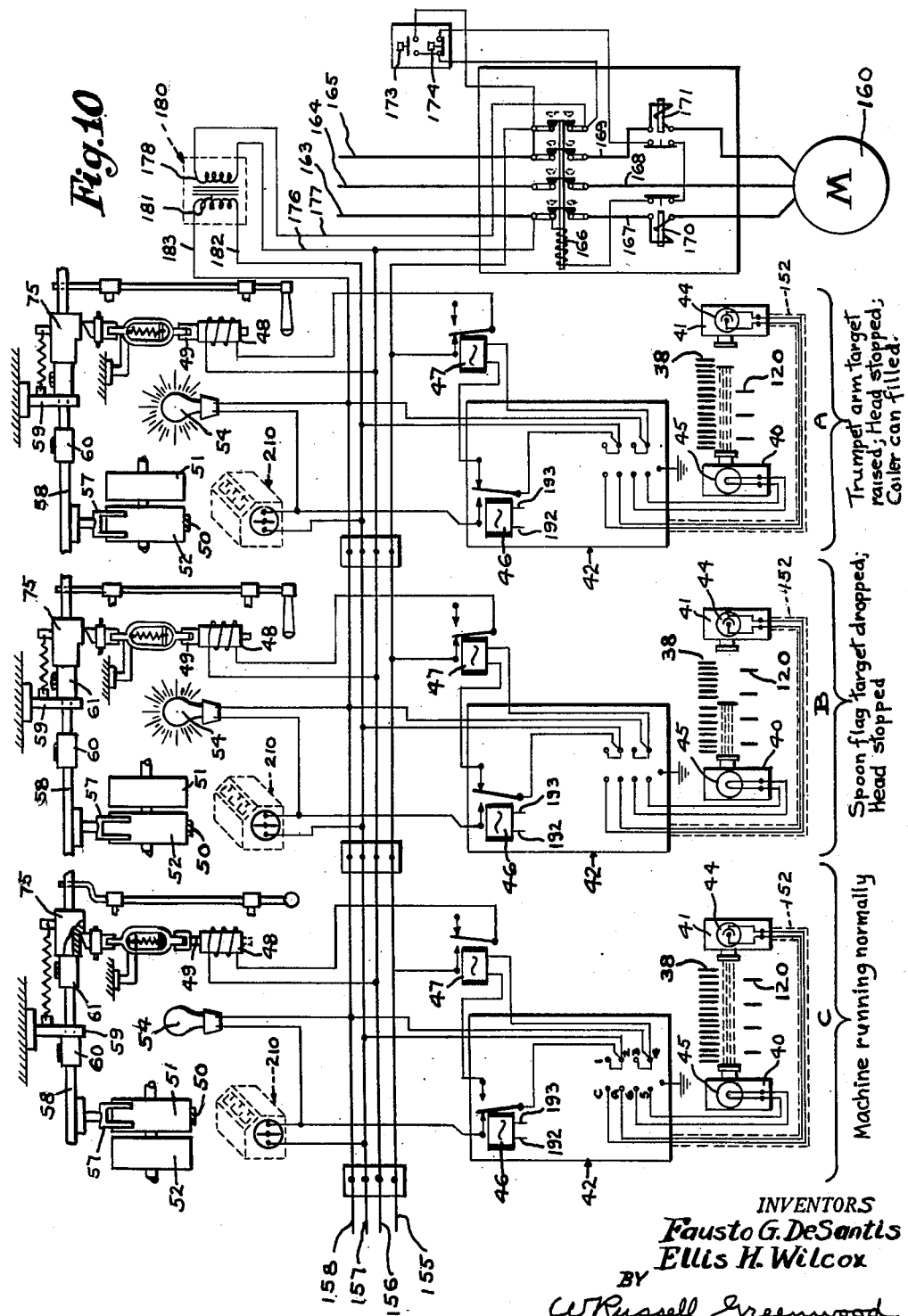

April 28, 1953

F. G. DE SANTIS ET AL 2,636,223

STOP MOTION FOR DRAWING FRAMES

Filed Aug. 26, 1950

INVENTORS
*Fausto G. DeSantis*
*Ellis H. Wilcox*
BY
W. Russell Greenwood
THEIR ATTORNEY April 28, 1953     F. G. DE SANTIS ET AL     2,636,223

STOP MOTION FOR DRAWING FRAMES

Filed Aug. 26, 1950                                 9 Sheets-Sheet 9

INVENTORS
Fausto G. DeSantis
Ellis H. Wilcox
BY
W Russell Greenwood
THEIR ATTORNEY Patented Apr. 28, 1953

2,636,223

UNITED STATES PATENT OFFICE 2,636,223

STOP MOTION FOR DRAWING FRAMES

Fausto G. De Santis, Quincy, Mass., and Ellis H. Wilcox, Washington, R. I., assignors, by mesne assignments, to Whitin Machine Works, a corporation of Massachusetts Application August 26, 1950, Serial No. 181,602

9 Claims. (Cl. 19—165)

This invention relates to automatic stop motions for textile drawing frames and the like.

One of the objects of the invention is the provision of improved means controlled by any of the usual independently operable stop or detector motions customarily applied at several places on each delivery of the drawing frame for automatically detecting a broken sliver or other condition for which they are designed to function whenever the running of the machine departs from normal, and which causes stoppage of the fiber working units or deliveries of an individual head immediately upon the operation of any of such stop or detector motions associated with each unit or delivery thereof, and also gives a signal notifying the attendant of such stoppage.

Another object of the invention is to provide a control means actuated by a light-sensitive device for initiating the operation of the automatic power-disconnecting mechanism which effects stoppage of the fiber working units or deliveries of an individual head of the machine, and in which the operation of the control means is actuated by the variation in intensity or interruption of a beam of light directed upon the light-sensitive device immediately upon the occurrence of a broken sliver or other departure from the normal working conditions of any of the fiber working units or deliveries of the head thus affected.

Another object of the invention is the provision of a light-sensitive electronic or photoelectric relay mechanism for controlling the operation of the automatic power-disconnecting mechanism which effects stoppage of the fiber working units or deliveries of one head of the machine, and in which such light-sensitive electronic or photoelectric relay mechanism will be actuated immediately upon a decrease in intensity or interruption of a normal uninterrupted light beam directed upon the light-sensitive device of the mechanism simultaneously by the operation of any of the several independently operable stop or detector motions associated with each fiber working unit or delivery of one head of such machine to cause stoppage of the respective units of that head in the event of a broken sliver or other departure from normal working conditions of any of the fiber working units or deliveries with which such stop or detector motions are associated.

In its broad aspects, the present invention contemplates the combination with spring-actuated means to automatically disconnect the driving power applied to the plurality of fiber working units or deliveries which constitute one head of the drawing frame, of a solenoid operated latch device which restrains the spring-actuated power-disconnecting means from acting until the solenoid is energized to release the latch, a source of light, a light-sensitive electronic relay mechanism controlled by a light-sensitive device, such as a photoelectric cell or phototube, and controlling a feed circuit for an electro-responsive device or relay which controls the energizing circuit of the said solenoid, and means for actuating the light-sensitive device in response to and controlled by stop or detector motions which operate immediately whenever certain conditions occur during the operation of the machine, viz., when a sliver breaks or runs out at the back between the source of supply and the drafting instrumentalities of a fiber working unit, when a sliver breaks between the front drawing rolls and the calender rolls of that unit or if conditions of excessive tension arise at such location due to abnormal thickness of sliver, and when a can at the front of the machine is filled to a predetermined level by the coiler of that unit. The light-sensitive device is enclosed in a separate housing situated on the machine so as to receive upon the photoelectric cell or phototube a normally uninterrupted beam of light directed across the machine from the light source which is housed in a separate unit mounted on the machine. The operation of the electronic relay mechanism is actuated whenever the light-sensitive device is de-energized by placing an obstruction between the light source and the light-sensitive device to interrupt or decrease the intensity of the light beam directed upon the light-sensitive photoelectric cell or phototube.

Independently movable target members, some being operatively associated with the individual spoons of the back stop or detector motion and the others being individual with and operatively associated with the front trumpet or calender roll stop motion of each fiber working unit or delivery, are arranged to move into the path of the light beam upon the operation of either of these stop or detector motions in the event of the occurrence of a broken sliver or any of the other conditions above mentioned which require immediate stoppage of the fiber working units or deliveries of the machine. During the normal operation of the drawing frame these target members are maintained out of the path of the light beam so that the degree of illumination upon the photoelectric cell or phototube is high.

The light-sensitive device is electrically connected in a circuit of said electronic relay mechanism which includes a phototube to apply a control voltage to the grid of the thyratron, and the phototube triggers the thyratron tube to cause the flow of plate current through a relay in series in the plate circuit of the thyratron tube whenever the applied grid control voltage becomes more positive than the critical or striking potential of the thyratron.

In the present application of the invention, the electronic circuit of the light-sensitive relay mechanism is arranged so as to energize the relay in the plate circuit of the thyratron when the illumination on the light-sensitive photoelectric cell or phototube is high at which time the grid control voltage is more positive than the critical or striking potential of the thyratron. When this relay is thus energized, the moving part or armature thereof is held in a position to effect de-energizing of the feed circuit to the second relay which controls the energizing circuit for operating the solenoid of the latch device so that the moving fiber working units of the machine perform their working functions uninterrupted. However, the arrangement of the electronic circuit is such that the applied grid control voltage to the thyratron becomes more negative than its striking potential when the illumination on the light-sensitive photoelectric cell or phototube is decreased in intensity or interrupted completely, which result is here obtained by movement of one or more of the target members into the path of the light beam directed upon the photoelectric cell or phototube to decrease or obstruct the illumination thereof upon actuation by one or more of the stop or detector motions associated with the fiber working units forming the head wherein the departure from normal operation of such units occurs. Consequently, the thyratron tube will not conduct current and the relay connected in series therewith will be de-energized.

Immediately when this relay is thus de-energized, the moving part or armature thereof will be thrown into a position to close the feed circuit and energize the second relay and cause it to operate the solenoid of the latch device thereby releasing the latched element to the action of its spring for movement automatically in a direction to effect disconnection of the driving power from the fiber working units or deliveries of the particular head wherein the conditions causing the stoppage occur.

The invention will be more clearly understood from the following description in conjunction with the accompanying drawings wherein there is shown a practical embodiment of our invention as applied to a textile drawing frame, and the invention resides in the combination of elements and arrangement of parts hereinafter described and more particularly set forth in the appended claims.

In the drawings:

Fig. 1 is a top plan view of a textile drawing frame of one head of four deliveries embodying the present invention;

Fig. 2 represents a fragmentary top plan view on enlarged scale, of one delivery of the drawing frame shown in Fig. 1 including both gearing end portions thereof as well as the main driving arrangement of the head, with portions of the machine partly broken away to show the spring operated shipper mechanism of the stop motion which effects an automatic disconnection of the driving power from the head, the light-sensitive electronic or photoelectric relay mechanism, and the solenoid operated latch device which normally holds the shipper mechanism latched in a cocked position until tripped by operation of the solenoid when the relay mechanism becomes operative upon obstruction of the light beam thrown onto the photoelectric cell or phototube that actuates the relay mechanism;

Fig. 3 represents a cross-section of one delivery of the machine shown in Figs. 1 and 2, taken substantially on the line 3—3 of Fig. 2, and on slightly enlarged scale, the machine being shown in running condition with the movable parts of the stop or detector motions and their associated targets in the positions they occupy during normal running of the sliver, and the arrows indicating the direction in which the sliver passes through the machine;

Fig. 4 is a cross-sectional view similar to Fig. 3, but showing the mechanism in actuated condition, that is to say, with the parts represented in the positions they assume when they have been actuated to throw off the power and stop the head due to a sliver breaking or running out at the back of the machine, a back spoon and its swingingly attached flag target lever being shown in dropped positions which they assume when the spoon is relieved of the weight and tension of the sliver normally running thereover, and with the flag target swung to cut off the illumination of the photoelectric cell or phototube by the light beam normally directed thereon;

Fig. 5 is a fragmentary top plan view similar to Fig. 2, but showing the parts in position after the stop motion mechanism has become operative to throw the belt shifter and shift the driving belt of the head to the loose pulley and stop the fiber working units or deliveries thereof when a sliver breaks between the front drawing rolls and the calendar rolls of the coiler device or if conditions of excessive tension occur at such location, the swingable flag target lever linked with movable trumpet arm being shown swung thereby into the position to intercept the light beam and the electronic relay mechanism controlled thereby has become actuated to throw the belt shifter;

Fig. 6 represents a transverse section taken on the line 6—6 of Fig. 5 showing the mechanism in actuated condition;

Fig. 7 is a cross-sectional view similar to Fig. 3, but showing the head stopped automatically when a can at the front has become filled, the swingable flag target lever linked with the detector motion engaging the coiler, and lifted thereby to raise the flag target into the position where it intercepts the light beam and the electronic relay mechanism controlled thereby has become actuated to throw the belt shipper and stop the head;

Fig. 8 is a perspective view of a portion of the belt shipper mechanism of the mechanical stop motion, as viewed from the back of the machine, showing the solenoid operated latch device and the position of the parts as they appear when the machine is stopped after latched element of the belt shipper mechanism has been released and the parts moved by the spring means in a direction to shift the belt to the loose pulley and stop the head;

Fig. 9 is an enlarged sectional detail view of the trumpet or calender roll stop motion including the full can stop motion, the parts being shown in their normal operative positions in full lines while the dot and dash lines represent the forward part of the trumpet arm tilted toward the calender rolls, due to abnormal thickness of the sliver within the trumpet, and the back of the trumpet arm in raised position bodily with its pivot and the forward end of the long lever in position whereby the target flag will be raised to obstruct the light beam and cause stoppage of the head;

Fig. 10 is a composite diagrammatic view representing a head of the machine in normal running condition and when the various stop or detector motions have been actuated to throw off the power to stop the head, the electric motor for driving the main power shaft of the machine, and the electrical control circuit for the motor also being shown, in which "Section A" of the drawing represents the machine in stopped position because of a normally uninterrupted light beam directed from a light source upon the photoelectric cell or phototube has been interrupted by a flag target, raised by mechanical levers actuated either by the full can stop motion when a coiler can is full or by the trumpet stop motion when a sliver breaks between the front rolls and the trumpet; in which "Section B" illustrates the head in stopped position because the light beam thrown onto the photoelectric cell or phototube has been interrupted by dropping of a flag target caused by downward tilting movement of a back spoon upon being relieved of the weight and tension of a sliver normally running thereover in breaking or running out; and in which "Section C" shows the machine with the stop motion mechanism and its photoelectric controls in their potentially operative position assumed when the machine is running normally during drafting;

Figure 1:
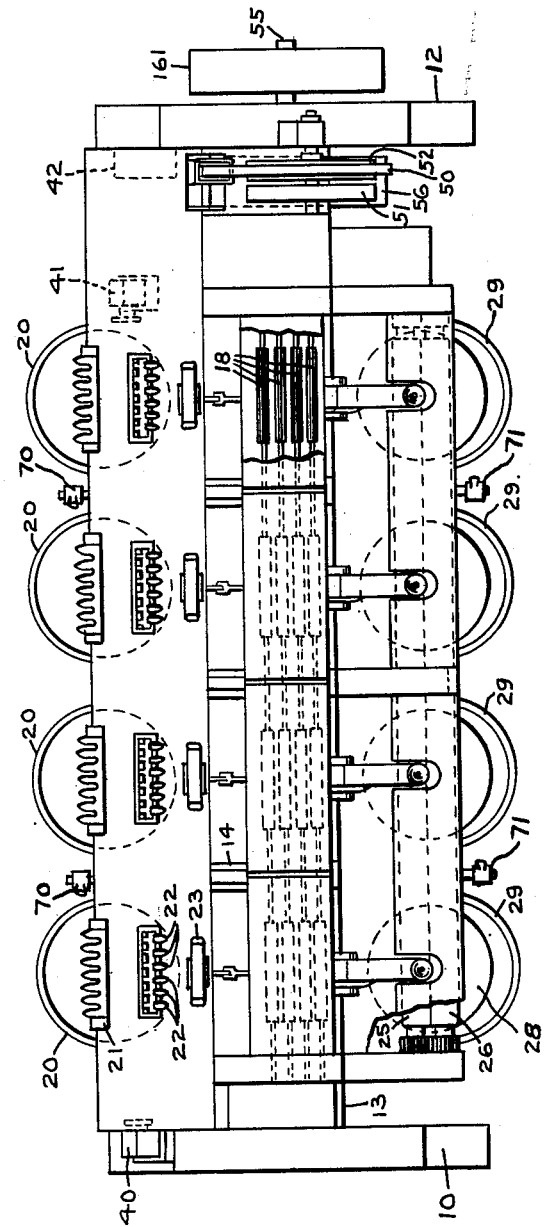
Figure 2:
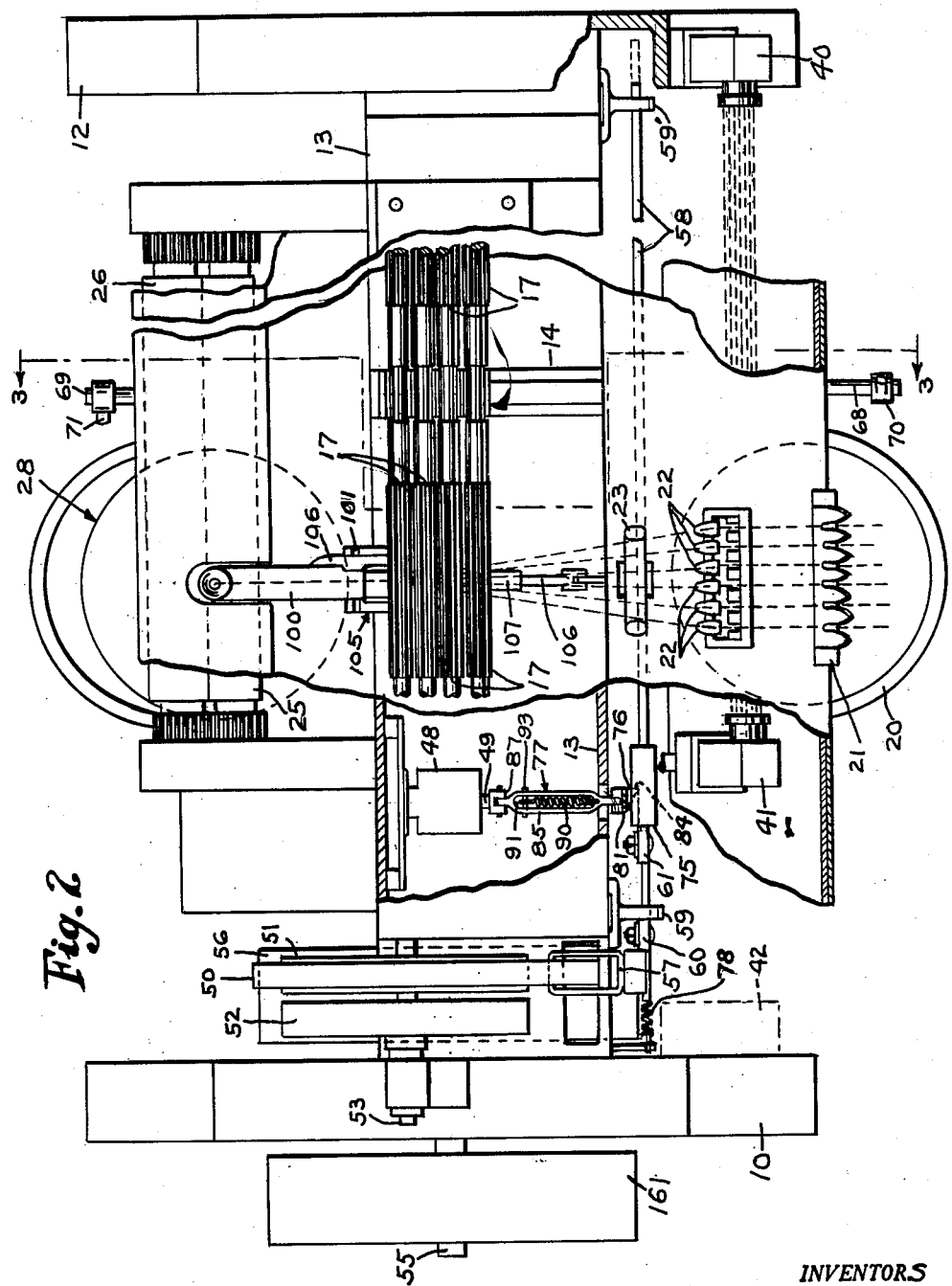
Figure 3:
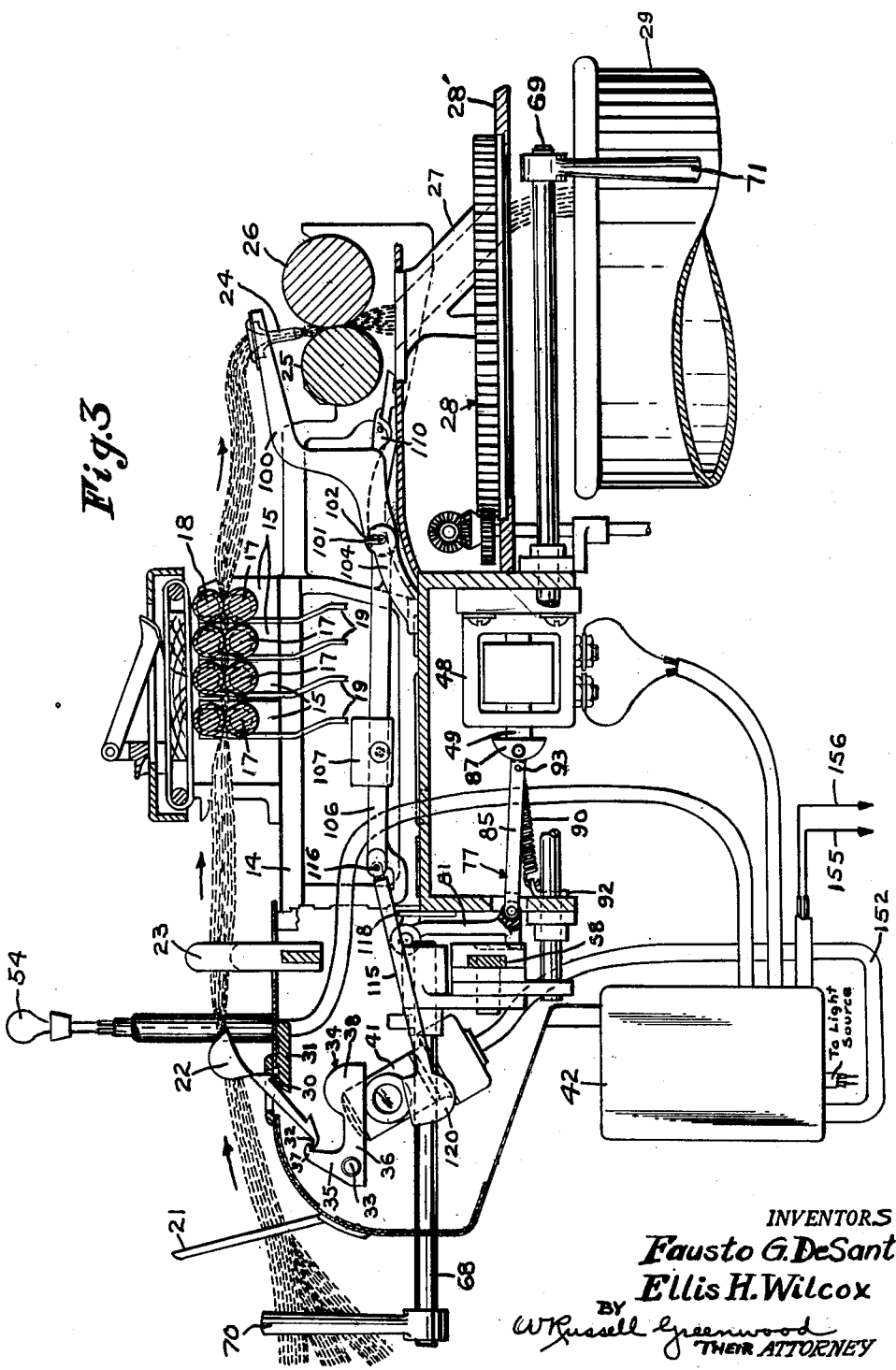
Figure 4:
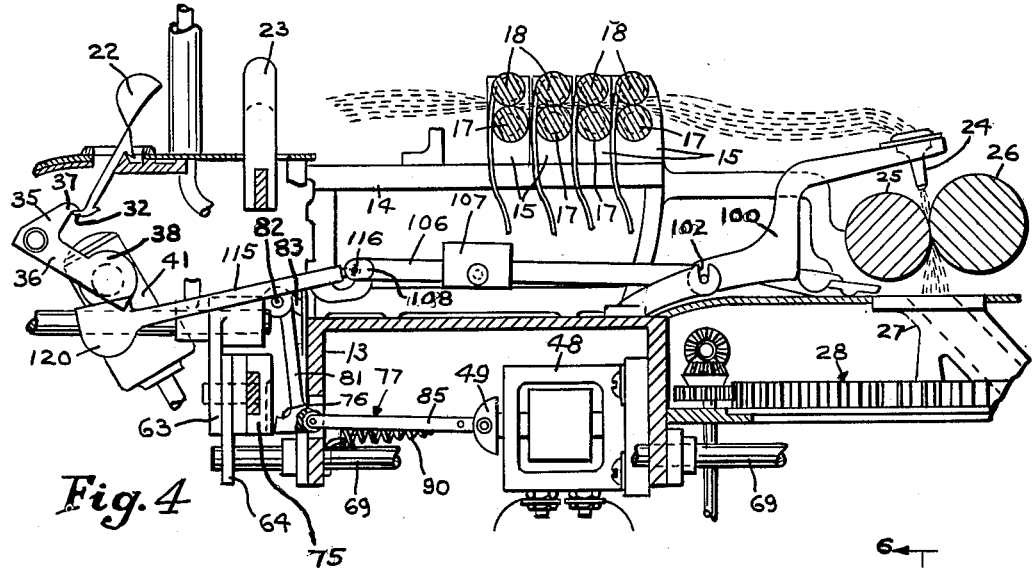
Figure 5:
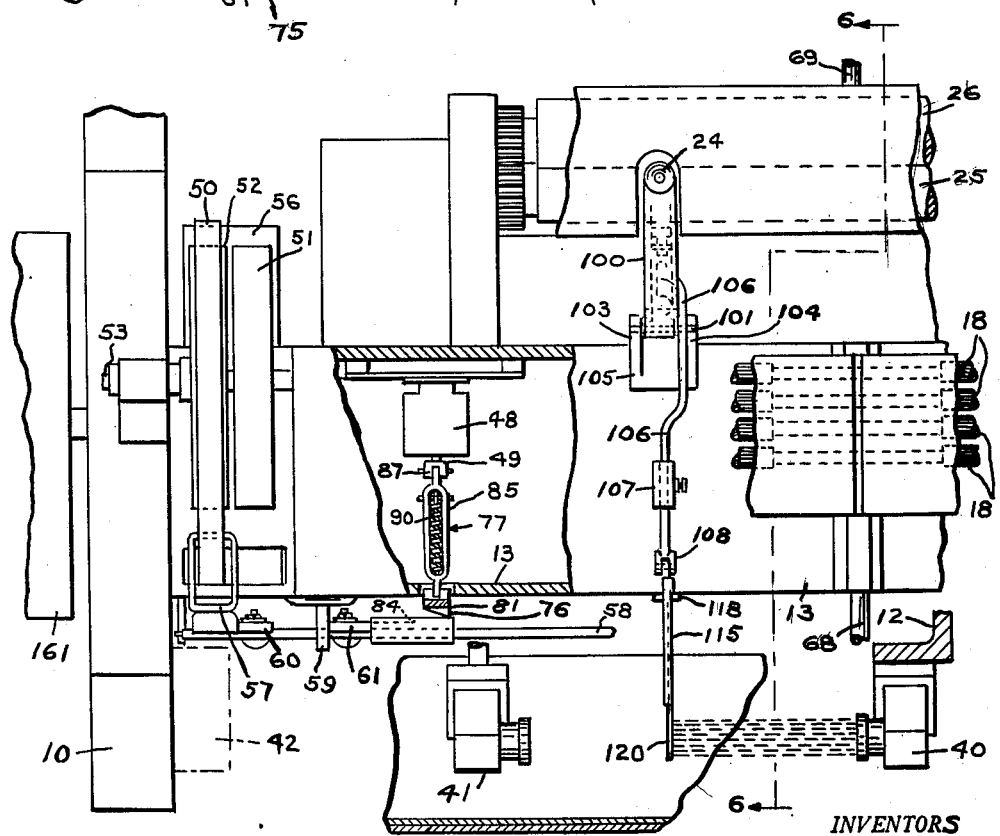

Referring more particularly to Figs. 1 and 3 of the drawings, the machine comprises, in general, suitable frame end members or legs 10 and 12 connected by the usual horizontally disposed roller beam 13 of inverted U-shape cross-section suitably secured to the upper ends of the legs 10 and 12. Mounted upon the roller beam 13 are a plurality of roll stand brackets 14 each adjustably supporting in a conventional manner a plurality of roll stands 15, see Fig. 2. The roll stand brackets 14 extend laterally of the roller beam 13 and they are suitably affixed thereto at appropriate locations therealong for supporting in an elevated position above the top of the roller beam 13 a series of sets or pairs of top and bottom drawing rolls which serve to grip the fibrous stock, such as card sliver, therebetween and constitute the main fiber drafting mechanism of the machine. As shown in Fig. 3, the roll stands 15 each are provided with a suitable vertical notch within which is mounted in the same roll stand the usual journal portions of the bottom drawing rolls 17 and the usual non-rotatable loose top roll bushings (not shown) which rotatably support therein the ends of the coacting top drawing rolls 18. The bushings for supporting the top drawing rolls 18 are of conventional construction having diametrically opposed flat portions which fit into and can slide up and down the vertical guideways of the notches of the roll stands 15 so that the top drawing roll 18 of each set is always positioned directly above its associated bottom drawing roll without further need for any other adjustment. In the present instance four pairs or sets of bottom and top drawing rolls 17 and 18 are shown but it is not intended that the number of pairs be thus limited as a maximum.

The top drawing rolls 18 are of the ordinary cushion type wherein the active fiber working portion is covered with an outer covering of leather, cork, or a suitable synthetic rubber-like composition although for coarse work metallic fluted rolls are generally preferred instead. The top drawing rolls 18 are weighted in the manner usually adopted for weighting such rolls whereby they are driven solely by contact with the rotating bottom drawing rolls 17 which, in turn, are positively driven.

The top drawing rolls 18 are forced downwardly into cooperative driving relationship with their companion bottom rolls 17 by downward pressure applied individually to the ends of each top roll by means of suitable hanger hooks 19 which are suspended by their upper hooked ends from the necks of the loose top roll bushings and have their lower ends connected to either a gravity deadweighting system involving individual weights and weight hooks, or to a spring pressure system incorporating individual spring-operated pressure units and pull rods. Such means for providing pressure to the top drawing rolls are well known weighting systems in such frames and they are so arranged as to obtain a given amount of pressure and the proper gripping action between the top and bottom drawing rolls of each pair or set to prevent slippage of the sliver being drafted in passing between the successive pairs of drawing rolls in the series during the drafting process.

The bottom drawing rolls 17 of the four pairs or sets here shown are of usual metallic fluted construction and formed on continuous shafts which extend longitudinally of the frame for substantially the entire length of the particular head unit with which they are associated. The rolls 17 are driven by suitable gearing, not shown, for obtaining the correct relative speeds and directions of rotation of the bottom rolls 17 to secure parallelism of the fibers and the desired total draft of the combined sliver when the card slivers fed thereto are doubled and drafted in travelling through the entire series of rolls which operate on the combined slivers successively to pull them forwardly.

The several card slivers taken from a group of cans 20 placed behind each delivery pass through fixed guides 21 and over spoons 22, there being one spoon for each sliver. The slivers next pass over the traversable arcuate guide members 23 and thence to the four sets of drawing rolls 17 and 18 where the necessary draft is inserted. All the slivers of the group being processed in each delivery become combined in passing through the drawing rolls and pass in the form of a single sliver to the usual trumpet 24. The draft inserted in the sliver by the drawing rolls is usually equal to the number of doublings, but may be otherwise in some cases, thus producing a drawn sliver combined at the trumpet 24 at the front of the machine of about the same weight as each end fed into the drafting mechanism at the back of the machine.

From the trumpet 24 the drawn combined sliver passes between the usual cylindrical calender rolls 25 and 26, and thence through the oblique tube 27 of the usual coiler or tube gear 28 by which it is coiled into the can 29. The calender rolls 25 and 26 are solid and self-weighted and serve to condense the sliver and draw it through the trumpet 24. The speed at which the calender rolls rotate is made such that their surface speed is just sufficient to prevent any slackness of the sliver as it is delivered from the front set of drawing rolls. The coiler and can arrangement at the front of the drawing frame is that usually adopted in drawing frames and is well known in the art, thus requiring no detailed description in connection therewith. The operation and function of the coilers 28 are well known and they are of usual construction in that each is rotatably mounted upon a bedplate 28' and driven by the usual bevel gearing and a spur gear that cooperates with gear teeth formed upon the outer periphery of the coiler, as shown in Fig. 3.

The foregoing construction is typical of the general structural arrangement of a conventional four-roll drawing frame which, in the present instance, is represented in Fig. 1, for the purposes of illustration only, as constituted of one head of four deliveries. In practice, however, the drawing frame usually involves a "line of drawings" consisting of two or more heads each incorporating from four to eight deliveries, and combined to make a single machine which will meet the production and space requirements of the mill; the several heads being connected together by extended framework and driven from a common power shaft situated beneath the roller beam and coextensive therewith. In such a machine, each of the several heads are arranged to be operated or stopped independently of the others, and each delivery of the head has its own coiler, drawing rolls, and the various stop motion mechanisms which automatically stop the head when the sliver breaks or runs out at the back, when the sliver breaks in front, and when the cans at the front become full.

The form of our improved stop motion mechanism and the manner in which the machine, i. e., each head, is stopped automatically when a sliver breaks or runs out at the back of an individual head is now described with reference to Figs. 2, 3, 4, 8 and 10. Referring to Figs. 2 and 3, it will be observed that each sliver passes over a back spoon 22 that is fulcrumed upon the wedge-shaped projection 30 of a horizontally disposed bar 31 which is suitably affixed to the framework of the machine. The spoon 22 is free to swing up and down upon the wedge 30 and its lower end is made slightly heavier than its upper end and terminates in an upturned pointed tip 32. Pivoted loosely on the horizontally disposed rod 33 for cooperation with each spoon are the individual flag target members 34, each of which carries two arms 35 and 36 disposed substantially at right angles to each other and of unequal length. The shorter arm 35 terminates at its outer end in a hook-shaped projection 37 which engages over and is swingably supported upon the pointed tip 32 of the spoon 22. The longer arm 36 is provided at its outer end with a partially circular enlargement 38 which forms the drop flag target for actuating the photoelectric controlled electronic relay mechanism hereinafter described which initiates the operation of the mechanism to throw off the power and cause stoppage of the particular head when the spoon is relieved of the weight and the tension of the running sliver supply fed to the drawing rolls because of breaking or running out at the back of the machine. Under normal operating conditions, the weight and the tension of the sliver is sufficient to hold down the upper end of the spoon 22 and, in turn, hold the short arm 35 upright and the target-carrying arm 36 substantially horizontal with the flag target element 38 raised well above and out of the path of a normally uninterrupted light beam directed from a light source unit 40 upon a light-sensitive phototube unit 41 of a light-operated photoelectric relay mechanism hereinafter termed an electronic relay control unit 42. Should the sliver break or run out at the back of the machine, the spoon 22 will be released, its lower end will drop in unison with the arm 35 of flag member 34, and the hook 37 will pivot upon the pointed tip 32 as the flag member 34 pivots about the rod 33 to swing the flag target 38 downwardly into the path of the light beam to intercept and completely block off its rays beamed onto the photoelectric cell 44 within the phototube unit 41 from the electric lamp 45 within the light source unit 40. This abrupt decrease in the illumination on the phototube, thus effected, actuates the electronic circuit and the relays 46 and 47 associated with the electronic relay control unit 42 (see Figs. 10 and 11) in a manner to energize the solenoid 48 which responds with appropriate movement of its armature 49 and by mechanical means hereinafter described, trips the spring-operated belt shipper mechanism, presently to be described, for disconnecting the power from the head by shipping the driving belt 50 from the usual tight pulley 51 to the usual loose pulley 52 on the main drive shaft 53 for the drawing rolls of the particular head of the frame, and immediately stopping the head. At the same time, a signal lamp 54 is lighted to give notice to the operator that the head is stopped because of operation of the automatic stop motion mechanism.

As shown in Figs. 1, 2, 3, 8 and 10, the driving belt 50 of one head of the frame is driven from the main power shaft 55 of the machine by a pulley 56 fixed thereto. The belt 50 is adapted to be shifted from the tight to the loose pulleys 51 and 52 respectively, and vice versa, by a shipper fork 57 which is suitably affixed to a movable shipper bar 58. The shipper bar 58 is mounted in suitable guides 59 and 59' (see Fig. 2) in which it is adapted to slide, the guides being suitably affixed to the roller beam 13. Adjustable stop blocks 60 and 61 are provided on the shipper bar 58 at opposite sides of the fixed guide 59 for alternately engaging the latter to limit the extremes of shipping movements of the shipper bar in opposite directions whenever it is moved in the appropriate direction to transfer the belt 50 upon the tight pulley 51 when starting the head, and in the opposite direction to place the belt upon the loose pulley to stop the head. The shipper bar 58 is arranged to be moved manually by means of the toggle levers 63 and 64 which are pivotally connected to the shipper bar 58 by a pin 65 affixed to the shipper bar and extending through the slotted portions 66 and 67 of both levers 63 and 64 respectively, see Fig. 8. The outer ends of the levers 64 and 65 are affixed to the shafts 68 and 69 respectively, which are provided with operating handles 70 and 71 respectively, whereby the toggle levers may be manually operated from either the front or the back of the machine to shift the shipper bar 58 and place the belt 50 upon the tight pulley 51 from the loose pulley 52, and vice versa, and to set the automatic stop motion mechanism. The manually operable toggle means for moving the shipper bar is used to transfer the belt 50 to the tight pulley 51 when starting the head, and also to move the spring-actuated striker 75 of the mechanical belt shipper mechanism into a latched position where it will be held by the detent 76 of the solenoid-operated latch device 77 against movement by the coiled spring 78 which is tensioned longitudinally and arranged so that one end thereof is connected with the bracket 79 carried by the striker and the other end fixed by attachment to a stationary support 80. The striker 75 is loosely mounted upon the shipper bar 58 and is slidable thereon. Whenever the striker 75 is free to be moved by the spring 78, upon disengagement of the striker from the detent 76 when the latch device 77 is tripped, this spring will force the striker against the stop block 61 and effect their further movement in unison along with the shipper bar 58 until the stop block 61 engages the shipper bar guide 59 thereby effecting the transfer of the belt to the loose pulley 52, and thus stopping the head. As shown in Figs. 3 and 8, the latch device 77 for the movable shipper bar 58 comprises a pendulous latch lever 81 pivoted at 82 to a suitable bracket 83 that is affixed to the roller beam 13. The lower end of the lever 81 carries the projection 76 facing the back of the machine and forming the detent which engages the reentrant abutment portion 84 of the striker 75 to hold it against movement by its spring 78 when the belt is placed on the tight pulley 51, as shown best by Fig. 2. The detent projection 76 on the lever 81 is beveled off on the side that is out of contact with the abutment 84, see Fig. 2. A lever 85 connects the latch lever 81 to the armature 49 of the solenoid 48 and is so arranged that one end thereof is pivotally connected at 86 with the bifurcated head 87 of the armature and the other end is pivotally connected at 88 with the bifurcated lug 89 of latch lever 81. The detent 76 of the latch lever 81 is held against the abutment portion 84 of the striker 75 by a coiled spring 90 which is arranged to normally exert a pull on the armature 49 to hold it in retracted position as shown in Fig. 3, and also force the latch lever 81 against the striker 75 to hold the detent 76 in engagement therewith. The body portion of the lever 85 is provided with an elongated opening 91 therethrough into which extends the upper end portion of the coiled spring 90. The spring 90 is suitably fixed at one end thereof to the roller beam as by a bracket 92, and is arranged with its upper end connected to the lever 85 by a pin 93 that extends crosswise of the opening 91 near the end thereof adjacent to the armature 49 of the solenoid 48. As previously explained, when the solenoid is energized by interruption of the light beam due to dropping of a flag target 38, because of breaking of the sliver in passing over a spoon 22 or of the sliver running out on back of the frame, the pivoted latch lever is retracted by the lever 85 and the armature 49 against the normal pull of the spring 90 to disengage the detent 76 from the abutment 84, thus releasing the striker 75 so that its spring 78 moves the striker, stop block 61, and shipper bar 58 in unison until the stop block 61 engages the guide support 59 for the shipper bar thereby moving the shipper fork 57 a corresponding distance and shipping the belt 50 from the tight pulley 51 to the loose pulley 52 and immediately stopping the particular head of the machine. In this case, also, the signal lamp 54 is lighted to give notice to the operator that the head has been stopped by functioning of one of the automatic control devices for actuating the stop motion mechanism.

The mechanism and the manner in which it operates for stopping the machine when the sliver breaks between the front drawing rolls 17, 18 and the calender rolls 25 and 26 is as follows, reference being made to Figs. 2, 3, 5, 6, 8 and 9. Each trumpet 24, of which there is provided one for each delivery of the machine and by which the sliver is guided from the front pair of drawing rolls to the calendar rolls, is supported above the nip of the calender rolls 25 and 26 by a movable arm 100 pivoted upon a pin 101 that is mounted in the vertical slotted guideways 102 at the outer ends of the arms 103 and 104 of the bifurcated bracket 105 affixed to the roller beam 13 of the machine. A long lever 106 is provided for each trumpet arm 100, each lever being pivoted upon the pivot pin 101. The long end of the long lever 106 passes under the drawing rolls 17 and 18 to the back of the frame. Each long lever 106 carries on the opposite side of the fulcrum or pivot 101 from the trumpet arm 100 an adjustable weight 107 that tends to lower the forked rear end 108 of the lever 106. At its forward end the lever 106 is provided with an integral finger 109 that is disposed beneath and bears against the underside of the short lever 110 which forms part of the full can stop motion of each coiler 28. The short lever 110 also is pivotally mounted at its inner end on the pivot pin 101 and is affixed thereto by a stud 112. The trumpet arm 100 carries an adjusting screw 113 and check nut 114 for obtaining the proper positioning of the trumpet 24 to give the required clearance above the calender rolls, see Fig. 9, the adjusting screw 113 being there shown extending downwardly from the trumpet arm 100 and with its head bearing upon the top forwardly extending portion of the short lever 110 to support the trumpet arm in its adjusted position.

The weight 107 is so adjusted as to barely overbalance and lift the trumpet arm 100 when there is no downward tension on the arm. When the weight 107 is adjusted to the desired position along the long arm of the long lever 106, the downward pull of the sliver, acting upon the trumpet 24 in running through the trumpet properly is sufficient to hold the trumpet arm 100 down and both the forked rear end of the long lever 106 and the weight 107 up, as shown in Fig. 3. This is because the weight and tension of the sliver is sufficient to cause the trumpet arm 100 to hold down the short lever 110; and since the short lever 110 rests on the finger 109, the weight 107 will be prevented from lowering the forked rear end portion of the long lever 106. On the other hand, when the sliver breaks at the front of the machine between the front pair of drawing rolls 17, 18 and the trumpet 24, the trumpet arm 100 is overbalanced by the weight 107, as soon as the end of the sliver has passed through the trumpet 24. The forked rear end portion 108 of the long lever 106 thereupon drops into the position shown in Fig. 6 and carries downwardly with it the forward arm portion of the lever 115 which is pivoted at 116 to the long lever 106 and is fulcrumed on the knife edge 118 that is suitably affixed to the roller beam 13. This downward movement of the forward arm portion of the lever 115 thus raises its rear arm portion to move the flag target 120 that is provided at its back end upwards to a height sufficient to completely interrupt the light beam directed from the light source 40 to the light sensitive photoelectric cell 44 of the phototube unit 41 thereby energizing the phototube controlled electronic circuits and associated relays 46 and 47 (see Figs. 5, 6 and 10) which action actuates the solenoid controlled latch device 77 thereby releasing the shipper bar 58 and allowing the spring 78 to pull the shipper bar in the manner previously described, shipping the belt 50 from the tight pulley 51 to the loose pulley 52, thus disconnecting the power from the particular head of the frame to stop that portion of the machine automatically when the sliver breaks at the front. The signal lamp 54 also is lighted when the head is stopped thus signalling the operator that the automatic stop motion mechanism has acted.

A finger 124 on the long lever 106 beneath the forked rear end portion 108 is beveled off on its outer end and serves as a stop to limit the extent of fall of the long lever when the back end thereof is lowered by the weight 107 as well as forming a rest for the lever 115 when its flag 120 is dropped out of the path of the light beam as would be the case when the machine is running normally or when no breaking of the sliver occurs at the front of the machine.

Figure 6:
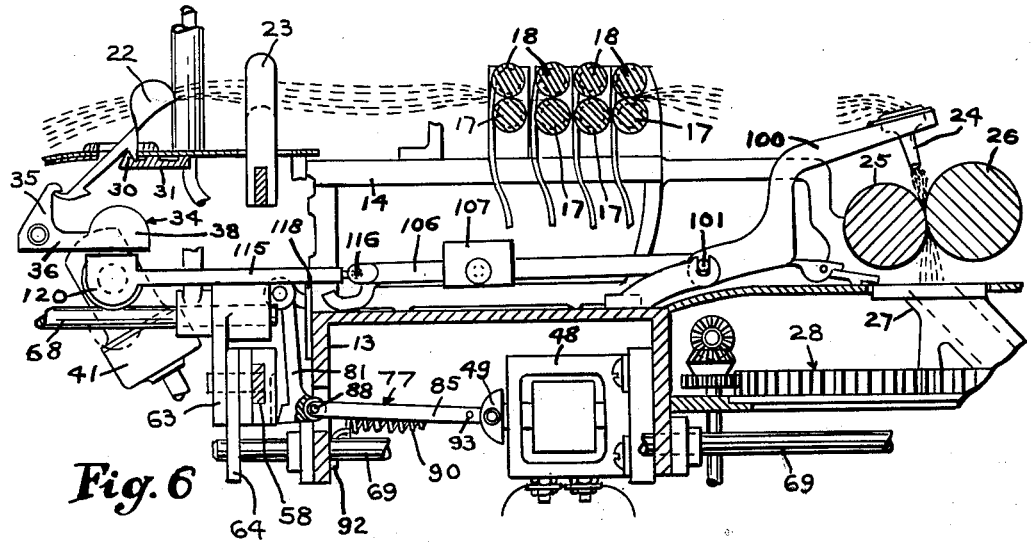

Referring to Figs. 6 and 9, the trumpet arm 100 is adapted to pivot upon the head of its adjusting screw 113 which bears against the short lever 110, and it so pivots if the sliver jams the trumpet at which time the forward extending portion of the trumpet arm is pulled downwardly due to pulling action of the calender rolls 25 and 26 on the jammed or bunched sliver in the trumpet 24, moving the upper end of the trumpet arm 100 upwardly, and forcing the pivot pin 101 bodily upwards in the vertical slotted guideways 102 at the outer ends of the arms 103 and 104 of the bracket 105 thereby carrying upwardly with the pin 101 the forward end of the long lever 106, which allows the weight 107 to lower the back arm portion of the long lever to raise the flag target 120 into the path of the light beam to interrupt the latter, thus stopping the machine in the same manner as when the sliver breaks in front (see Fig. 6).

Figure 7:
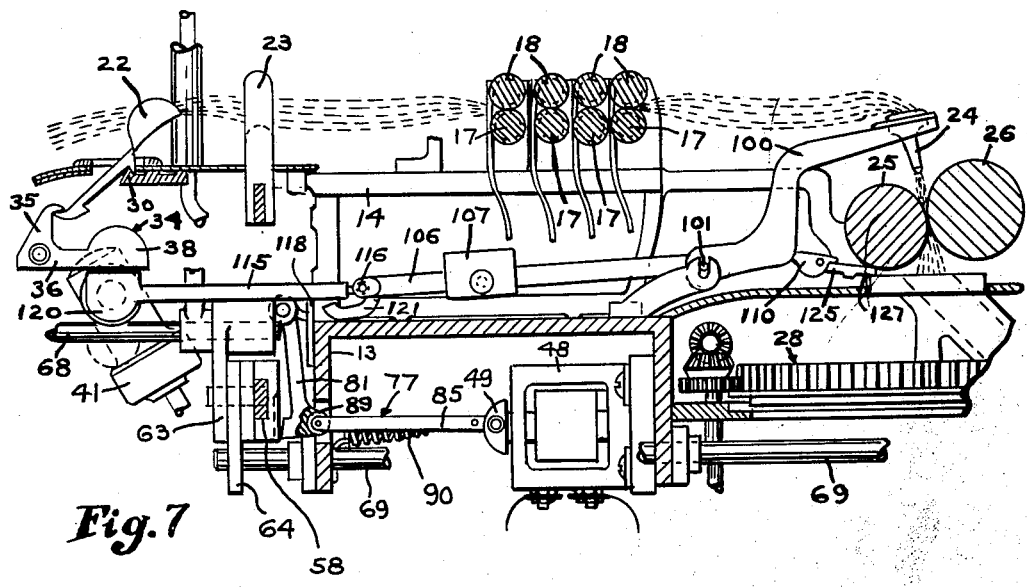

Referring to Figs. 3, 7 and 9, the coiler 28 is adapted to be lifted slightly above the seat on its bedplate 28′, and it becomes so lifted when the column of sliver below it has increased sufficiently during filling of the can 29. The form of automatic controller for operating the photoelectric controlled electronic relay mechanism to cause stoppage of the head when a can 29 is filled is shown best by Figs. 3 and 9 and is as follows: A finger 125 has its inner end pivoted at 126 to the forward end portion of the short lever 110, and is provided with a forwardly extending portion 127 which extends laterally over and bears against a portion of the coiler 28. The finger 125 is kept pressed against the coiler by the weight of the trumpet arm 100 which, as previously described, bears against the short lever 110 on the head of the adjusting screw 113, and, in turn, holds down the finger 125 by pressure applied thereto by engagement of the finger with the under side of the outer end portion of the short lever 110. The proper position of the short lever 110 and the finger 125 is obtained by means of an adjusting screw 129 and a check nut 130. A small projection 131 on the lower side of the finger 125 rests on the coiler cover 132 and provides an additional support for maintaining the adjusted position of the forward extension 127. If too much sliver is coiled into a can 29, or when a can is filled, the sliver presses upward against the under side of the tube gear or coiler 28 until it is lifted. A very slight upward movement of the tube gear 28 is sufficient to lift the finger 125 and the short lever 110, thus lifting the trumpet arm 100 bodily along with the pivot pin 101 in its slotted guideways in the bracket 105. This raises the forward arm portion of the long lever 106 which action causes the weight 107 to lower the back arm portion of the long lever thus actuating the lever 115 and raising the flag 120 to a height sufficient to completely interrupt the light beam directed from the light source 40 to the light-sensitive photoelectric cell 44 of the phototube unit 41 thereby actuating the electronic phototube controlled electronic circuits and associated relays 46 and 47 (see Figs. 7 and 10) in a manner to operate the solenoid controlled latch device 77 thus disengaging the striker 75 from the detent 76 and throwing the belt shipper bar 58 by the action of its spring in a direction to effect the disconnection of the power to the particular head by transfer of the belt 50 from the tight to the loose pulley, as hereinbefore explained. The full can stop or detector motion normally is set so that the head will be stopped before the sliver at the top of the can becomes stretched or uneven.

The light source unit 40 housing the electric lamp 45, phototube unit 41 containing the phototube of photoelectric cell 44, and the electronic relay control unit 42 incorporating the electronic amplifier circuits and relays 46 and 47, are of the type constituting well known parts of standard available equipment as hereinafter explained. The light source and the phototube housings, in the form herein illustrated, are each separate enclosures or units that can be positioned at the point of operation in opposed relation so that the light beam from the light source unit 40 will be directed on the light-sensitive phototube 44 within the housing 41 to supply the proper illumination for exciting the phototube therein. Essentially, the light source unit 40 comprises a lamp socket (not shown), a low voltage electric lamp 45, and a suitable protective housing with a focusing lens, together with a proper voltage power supply. This power supply for the lamp 45 may be a transformer with a low voltage secondary winding and integrally mounted in the light source unit or, as in the present case, it may be a separate winding 150 on the transformer 151 within the electronic relay control unit 42. The phototube unit 41 consists essentially of a socket (not shown) for holding the phototube 44, a protective housing, and a suitably shielded cable 152 for connection of the phototube 44 to the electronic relay control unit 42, the cable 152 being run in a suitably grounded conduit indicated in dash outline in Fig. 11.

The light source unit 40, the phototube unit 41, and the electronic relay control unit 42 are devices of the type forming part of standard light-sensitive or photoelectric relay mechanisms and industrial electronic control equipment supplied by such well known manufacturers in the United States of America as the General Electric Company, Schenectady, New York, the Radio Corporation of America, Camden, New Jersey, the Westinghouse Electric Corporation, East Pittsburgh, Pennsylvania, and Photoswitch Incorporated, Cambridge, Massachusetts.

Figure 11:
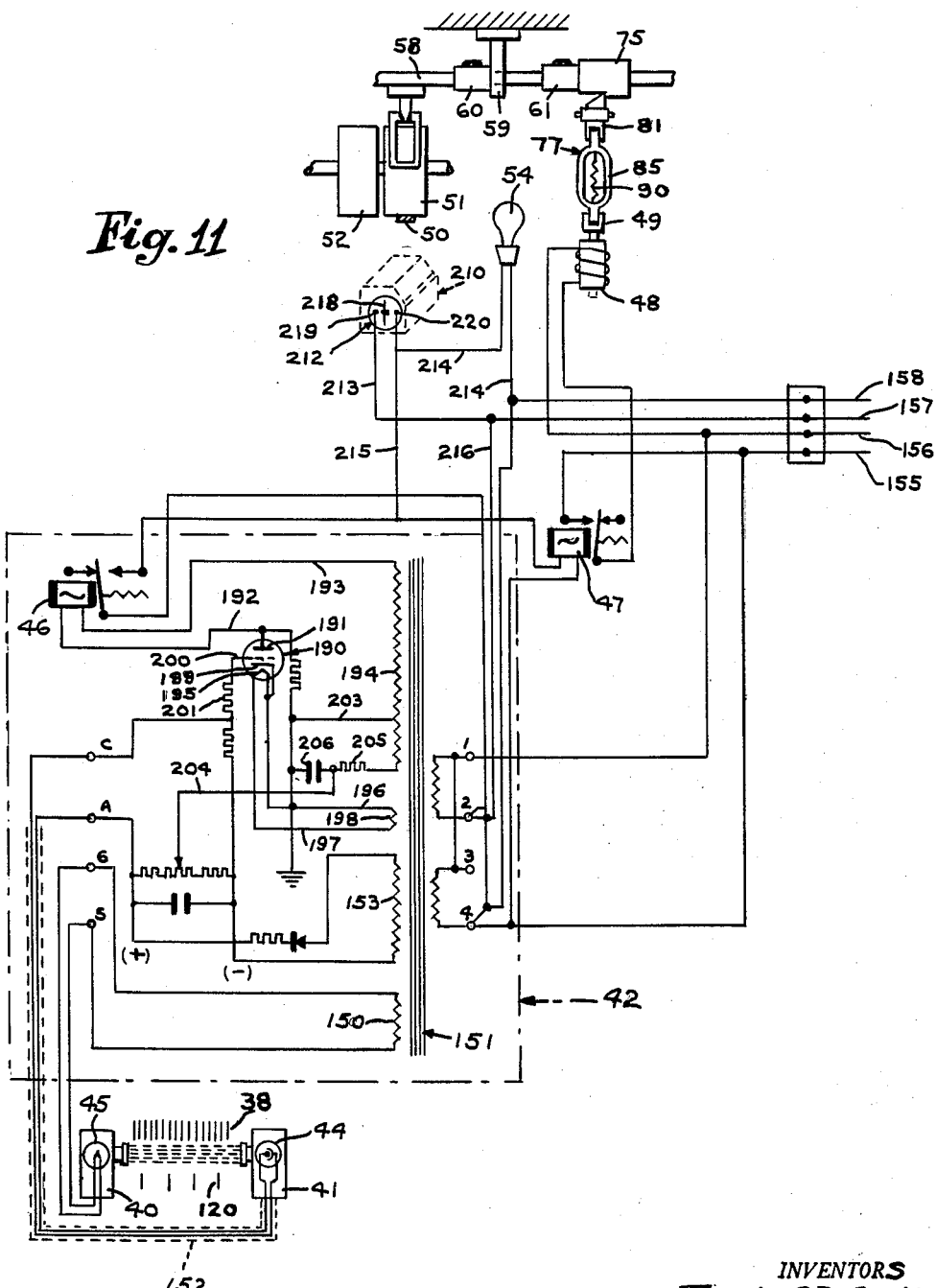
Fig. 11 is a diagrammatic view of "Section C" as represented in Fig. 10 but further showing the schematic electrical circuit of the Westinghouse Type RX Phototroller herein employed as the light-sensitive electronic or photoelectric relay control mechanism which initiates the operation of automatic mechanism to throw off the power and stop the head.

The theory of operation and general application of such equipment is well known, and such equipment is shown and described in various publications provided for free distribution by the above-mentioned manufacturers from time to time. In view of this, it will be understood that the various automatic stop or detector motions for controlling the light-operated relay mechanism for effecting disconnection of power from the particular head of the machine to be stopped, and which form our invention as shown in Figs. 1 to 10 inclusive of the drawings, will carry out their intended purpose or function of automatically stopping the particular head of the frame (a) when the sliver breaks or runs out at the back, (b) when the sliver breaks or jams at the front, and (c) when the cans at the front become full, by suitable connection of the light source unit 40 and the phototube unit 41 to their respective power supply circuits and the electronic tube relay control circuit within the electronic relay control unit 42, as shown in Fig. 10, and in greater detail in Fig. 11. The voltage source for the lamp 45 of the light source 40 and the phototube 44 within the phototube housing 41 are shown in Fig. 11 as being obtained from separate secondary windings 150 and 153 respectively on the transformer 151 within the electronic relay control unit 42. In the wiring diagram shown in Figs. 10 and 11 branch feed lines 155, 156, 157 and 158 are shown which provide a source of proper voltage available for the primary of the transformer 151 as well as for the relays 46 and 47, the solenoid 48, and the control circuit of the signal lamp 54 by suitable electrical connection of said feeder lines with the electrical circuits of a standard and well known motor control system for operating the A.-C. electric motor 160 which drives the main power shaft 55 of the drawing frame in a suitable manner, such as by means of a belt (not shown) connecting the motor pulley (not shown) with a pulley 161 fixedly secured to the main power shaft 55. The electrical circuits in themselves form no part of our present invention and although there is illustrated in Figs. 10 and 11 one way of electrically connecting the relays 46 and 47 of the electronic relay control unit 42, and the solenoid 48 with the other parts of the circuit it is to be understood that the wiring diagram there shown is merely for illustrative purposes and that other wiring arrangements can be interposed between the phototube 44 and the solenoid 48 which controls the latch device 77 to effect its operation.

In the wiring diagram illustrated in Fig. 10, the main power supply circuit for the electric motor 160 thereshown may be a three-phase alternating current circuit of suitable voltage, such as 220 volts. The supply wires are indicated at 163, 164 and 165. At 166 is the solenoid actuated main switch which connects and disconnects the motor with the main power source, the switch 166 being here shown in circuit-closed position with the motor driving the main power shaft 55 of the drawing frame.

The leads 167, 168 and 169 from this switch are connected to the motor, the leads 167 and 169 being connected through suitable overload heater elements 170 and 171. The solenoid 172, of the switch 166, upon being energized by manually closing the normally open push button motor starter switch 173 connected in series with the normally closed manually operable push button motor stopping switch 174, moves the movable contact members of the switch 166 into circuit-closing position with the fixed contacts thereof thereby connecting the leads 167, 168 and 169 with the high voltage supply wires 163, 164 and 165 respectively. The wires 176 and 177 connect one phase of the power source with the primary winding 178 of the transformer 180. This transformer is for the purpose of supplying a low voltage current for the control circuit for the signal lamp 54 and, as shown, has its secondary winding 181 connected by wires 182 and 183 to the branch feeder wires 157 and 158 respectively.

The particular light source unit 40, phototube housing unit 41 and electronic relay control unit 42 shown in the drawings to exemplify the type of commercially available photoelectric relay equipment which may be used in carrying out our invention are disclosed in a descriptive pamphlet published and distributed by the Westinghouse Electric Corporation, entitled "Electronic Tube Control, Phototrollers, Light Operated Photo-Electric Relays" and designated as "Price List 18–310," dated May 26, 1947. In the present application of the invention it is preferable to mount the light source unit 40, the phototube housing unit 41, and the electronic relay control unit 42 separately on the machine so that for this purpose a light source identified as Westinghouse Type F is used in conjunction with a phototube housing identified as Westinghouse Type A and an electronic relay control unit identified as a Westinghouse Type RX Phototroller, for 60 cycle 115/230 volts power supply as shown and described on pages 2, 3 and 4 of the aforedescribed "Price-List 18–310." For more detailed information concerning the Westinghouse Type RX Phototroller unit reference may be had to the undated instruction booklet published and distributed by the Westinghouse Electric Company of East Pittsburgh, Pa., entitled "Westinghouse Type RX Phototroller. Instruction Book 5670–43–A (1–47)." As stated on page 1, section 1, of said booklet in connection with the electronic equipment there described:

"The RX Phototroller is one type of a line of general purpose photoelectric relays operated by an increase or decrease in the amount of light falling on a phototube. These relays are arranged to initiate an electrical sequence in response to changes in illumination caused by partially or completely making or breaking a light beam.

"The type RX is suitable for most indoor industrial applications.

"A WL–629 thyratron which is controlled by a WL–735 Phototube operates the SG relay. The RX Phototroller is arranged to energize the SG relay when light is put on the phototube. A minimum of five foot candles light intensity is required to bring about operation of 50% or more if the light is to be interrupted."

Figure 13:
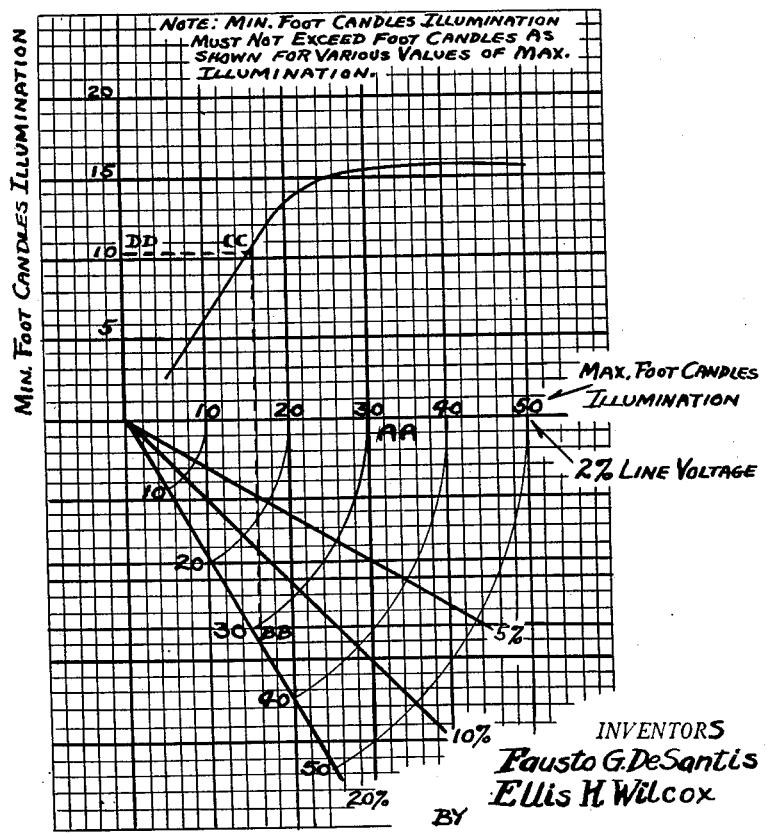
Fig. 13 is a curve showing minimum illumination as a function of maximum illumination on the phototube and the per cent A.-C. voltage variation that can be used with the Type RX Phototroller.

On page 2, section 4, of the abovementioned instruction booklet it is stated in connection with an accompanying circle diagram curve here duplicated in Fig. 13 that the light source must be taken that the minimum illumination on the phototube must not exceed the values given in this curve. In this figure are shown different scales for the maximum illumination for different percentage changes in A.-C. line voltage. Using, for example, the basic 2% curve, it is seen that if the maximum illumination is 30 foot candles, the minimum illumination must not exceed 15 foot candles. If, however, the maximum line voltage variation is 20 per cent and the maximum illumination is 30 foot candles at maximum A.-C. voltage, then the minimum illumination 10 foot candles is found by following the circle from AA to BB, then to CC and DD.

The schematic circuit for the Westinghouse Type RX Phototroller is diagrammatically shown in Fig. 11 within the box indicated in dot and dash outline. The Phototroller is equipped with a type WL-629 thyratron tube 190 which is controlled by a type WL-735 phototube 44. The thyratron tube 190 is a gas-filled discharge tube consisting of an anode 191 connected by lead 192, relay coil 46 and lead 193 to the main secondary winding 194 of the transformer 151, a heater 195 connected by leads 196 and 197 to a separate heater winding 198 on the transformer 151, a cathode 199 connected to lead 196, and a control grid 200 connected to the 5 meg. resistor 201. The characteristics of the WL-629 thyratron tube 190 are such that when the grid 200 has a negative potential exceeding approximately 6 volts relative to the cathode 199 the tube does not become ionized, and no current is conducted through the tube. If the grid potential is made more positive, the tube breaks down and conducts rectified current through relay coil 46 during the half cycles when lead 193 is positive in relation to lead 192.

In the circuit shown in Fig. 11, the grid control voltage consists of the A.-C. voltage component between leads 203 and 204, obtained by means of the phase shift circuit consisting of resistor 205 and capacity 206, and the D.-C. voltage component between lead 204 and the cathode of the phototube 44. The voltage between the leads 2-3 and 204 is advanced 135° relative to voltage between the leads 203 and 193. The D.-C. voltage component between the cathode of the phototube and lead 204 changes its magnitude and polarity when the illumination on the phototube is varied, so that the cathode voltage of the phototube is positive in relation to lead 204 when the degree of illumination on the phototube is high, and becomes negative when the illumination on the phototube is decreased.

Figure 12:
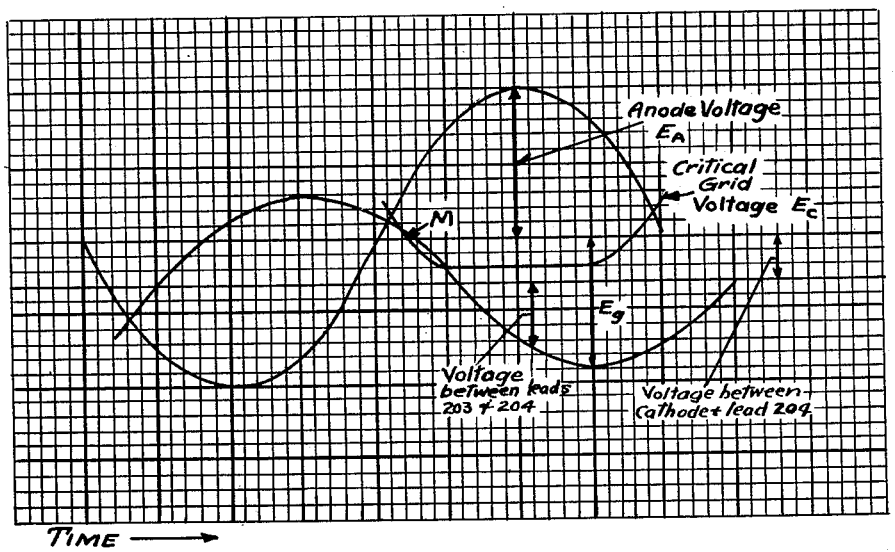
Fig. 12 depicts curves which show the relation between the various control voltage characteristics for the Westinghouse Type RX Phototroller, the schematic electrical circuit of which is shown in Fig. 11.

In Fig. 12 is shown the relation between the various control voltages. The curve $E_c$ is the characteristic grid control curve for the WL-629 tube. In order to make the tube conduct current the instantaneous grid voltage must be more positive than shown by this curve. The grid control voltage as shown consists of the constant A.-C. voltage between the leads 203 and 204 superimposed on the variable D.-C. voltage between the cathode of the phototube and lead 204. In the position shown voltage $E_g$ intersects voltage $E_c$ at M, and at this point, therefore, the tube breaks down and conducts current during the remainder of the half cycle of voltage $E_a$. If now voltage between the cathode of the phototube and lead 204 be made more negative by decreasing the illumination on the phototube, voltage curve $E_g$ is moved down so that the curve does not intercept the critical grid voltage curve $E_c$. For this reason the thyratron tube 190 will not conduct current and the relay 46 connected in series with the tube will be de-energized.

A predetermined counter form of controller for operating the spring-actuated belt shipper mechanism, independently of any of the automatic stop or detector motions hereinbefore described for actuating the electronic relay control mechanism 42, when measured lengths of drawn sliver are delivered in designated predetermined lengths at the front rolls of the drawing frame, is shown in the drawings and indicated therein at 210, in broken lines, see Figs. 10 and 11. Predetermining counters are well known devices and the structure thereof "per se" forms no part of the present invention, the counting device 210 herein employed being of a standard and commercially available type of predetermined counting device, such as supplied by Veeder-Root Incorporated of Hartford, Connecticut. The counter device 210 embodies a make-and-break switch indicated at 212 and controlling mechanism therefor operative automatically upon completion of a predetermined number of operations and arranged to be reset manually to place the counting wheels at zero and the predetermining wheels at the designated predetermined number, the operation and construction of several such devices being fully described and claimed in Patent No. 2,040,027 to Northrop, patented May 5, 1936, and Patent No. 2,159,314 to Bliss, issued May 23, 1939, both patents being assigned to Veeder-Root Incorporated as assignee. The counter device 210 may be suitably driven from a bottom front drawing roll. As shown in Fig. 11, the switch 212 of the mounting device 210 is connected by leads 213 and 214 to the branch feed lines 157 and 158 respectively, and by leads 215 and 216 to the energizing circuit of relay 47 which actuates the solenoid 48 for operating the latch device 77, the signal light 54 being in series with the lead 214 for providing a continuing indication whenever the counter mechanism has been actuated and the designated predetermined measured lengths of drawn sliver has been delivered at the front drawing rolls as counted off on the predetermining counting wheels of the counter device 210 through the closing of the make-and-break switch 212 thereof. The switch 212 is diagrammatically indicated by the movable switch arm 218 and fixed contacts 219 and 220 connected to leads 213 and 215 respectively. Closing of the make-and-break switch 212 actuates the relay 47 and thus energizes the solenoid 48 which, in turn, actuates the latch device 77 to disengage the detent 76 from the striker 75. As previously explained, when the striker is thus released, its spring 78 effects shipping movement of the striker and the shipper bar 58 to transfer the belt 50 from the tight to the loose pulley and thus automatically disconnect the power from the particular head to be stopped.

It is to be understood, however, that the automatic power disconnecting mechanism is not intended to be limited to a spring actuated belt shipper mechanism as herein shown and described since it will be obvious to those skilled in the art that the spring actuated reciprocable bar 58 may be suitably connected to an electric switch so that when the bar is tripped by the solenoid-operated latch device 77 the switch will be thrown in a direction to stop the driving motor for the frame.

What is claimed is:

1. In a textile drawing frame stop motion, the combination with an automatic belt shipper mechanism releasable from a manually set position by solenoid actuated detent means; of a series of spoons independently swingable in adjacent parallel planes, respectively, a series of pivoted levers separately swingable in corresponding parallel planes and operable by said spoons, each of said pivoted levers including an arm portion carrying a target element, a light-sensitive device, a light source arranged to direct a normally uninterrupted beam of light upon said light-sensitive device, and control circuits including a thyratron tube and relay means electrically connected with and subject to the control of said light-sensitive device and adapted to energize the solenoid actuated detent means to initiate the operation of said automatic belt shipper mechanism for stopping the machine when said light beam is intercepted by a target element to prevent illumination of the light-sensitive device whenever rocking movement of a spoon and its associated target lever occurs upon being relieved of the weight and tension of a sliver normally running over the spoon when the sliver breaks or runs out.

2. In a textile drawing frame stop motion, the combination with an automatic belt shipper mechanism releasable from a manually set position by solenoid actuated detent means; of a series of spoons fulcrummed upon a common supporting bar for rocking movement thereon and independently swingable in adjacent parallel planes, respectively, a series of pivoted levers one for each spoon and operatively connected to the associated spoon, said levers also being separately swingable in corresponding parallel planes upon a common supporting member and operable by said spoons, each of said pivoted levers including an arm portion carrying a target element, a light-sensitive device, a light source arranged to direct a normally uninterrupted beam of light upon said light-sensitive device, and control circuits including a thyratron tube and relay means electrically connected with said light-sensitive device and adapted to energize the solenoid actuated detent means to initiate the operation of said automatic belt shipper mechanism for stopping the machine by dropping of a target element into the path of said light beam to interrupt said beam and prevent illumination of the light-sensitive device whenever rocking movement of a spoon and its associated target lever occurs upon being relieved of the weight and tension of a sliver normally running over the spoon when the sliver breaks or runs out.

3. In a textile drawing frame, the combination with an automatic belt shipper mechanism, of a stop or detector motion at the back of the machine for detecting and stopping the frame immediately when a sliver breaks or runs out between the back drawing rolls and the source of supply of the sliver comprising a series of spoons each fulcrumed for independent tilting movement and normally held in a balanced position by the weight and tension of a sliver being pulled thereover by the back drawing rolls, a series of pivoted levers each having two arms one of which has pivotal engagement at its outer end with the outer end of said spoon, the other arm of said lever being provided at its outer end with an enlargement which forms a flag target, and a photoelectric control mechanism for initiating the operation of the automatic belt shipper mechanism for disconnecting the power from the frame upon dropping of the lower end of the spoon when relieved of the tension and weight of a sliver when it breaks or runs out, said control mechanism comprising a light-sensitive electronic mechanism having a photoelectric cell or phototube electrically connected therewith, a light source arranged to direct a normally uninterrupted beam of light upon said phototube, an electric circuit, a relay in said circuit maintained normally energized by the electronic circuit of said mechanism and with its armature in open circuit position to maintain a second electric circuit open, a relay in said second circuit, a solenoid operated latch device in series with said second relay and adapted to be tripped to cause automatic operation of said belt shipper mechanism whenever tilting movement of a spoon and its associated pivoted target carrying lever occurs upon being relieved of the weight and tension of a sliver when it breaks or runs out to cause interruption of said light beam by a flag target and prevent illumination of said photoelectric cell or phototube by said light source.

4. In combination with a textile drawing frame having an automatic belt shipper mechanism releasable from a manually set position by solenoid actuated detent means for stopping the machine, and having a plurality of separate fiber working units or deliveries each including its own drafting instrumentalities and an individual coiler mechanism, of a stop motion comprising a series of spoons associated with each delivery and independently rockable in adjacent parallel planes, each spoon being normally held in a balanced position by the weight and tension of a running sliver in engagement with the spoon while being pulled thereover as it is fed into the drafting instrumentalities of the said delivery from a source of supply, a series of pivoted levers separately swingable in corresponding parallel planes and operable by said spoons, each of said pivoted levers including an arm portion carrying a target element, a light-sensitive device, a light source arranged to direct a normally uninterrupted beam of light upon said light-sensitive device, and control circuits including a thyratron tube and relay means electrically connected with and subject to the control of said light-sensitive device and adapted to energize the solenoid actuated detent means to initiate the operation of said automatic belt shipper mechanism for stopping the machine by dropping of a target element into the path of said light beam to interrupt said beam and prevent illumination of the light-sensitive device whenever rocking movement of a spoon and its associated target lever occurs upon being relieved of the weight and tension of a sliver normally running over the spoon when the sliver breaks or runs out.

5. In a textile drawing frame of the belt driven type, the combination with a coiler device and an automatic belt shipper mechanism releasable from a manually set position by solenoid actuated detent means, of a stop or detector motion comprising a movable trumpet holder detector arm, a pivoted lever including an arm portion carrying a target element, means including a long lever carrying an adjustable weight and operatively arranged for actuating said target lever in response to the movement of said trumpet holder detector arm into a detecting position, a light-sensitive device, a light source arranged to direct a normally uninterrupted beam of light upon said light-sensitive device, said long lever movably supporting said trumpet holder detector arm and being held thereby in a balanced state whereby the target element of the pivoted lever is caused to assume a position below and out of the path of said light beam when the frame is running normally, and control circuits including a thyratron tube and relay means electrically connected with and subject to the control of said light-sensitive device and adapted to initiate the release and operation of said automatic belt shipper mechanism for stopping the frame when said light beam is intercepted by upward movement of said target element to prevent illumination of the light-sensitive device by said light source upon appropriate bodily movement of said trumpet holder detector arm to cause dropping of the long lever portion of said means with said weight by gravity to move the target element upwards across the path of said light beam on breakage of a sliver between the front drawing rolls and the usual trumpet or due to lifting of the coiler device when a can is filled.

6. In a textile drawing frame having a head incorporating a plurality of individual fiber-working units or deliveries each having sliver detecting spoons independently movable into and out of a detecting position and drafting instrumentalities and a coiler mechanism including a movable trumpet holder detector lever operatively arranged for movement by being lifted into a position under coiling conditions of increased sliver tension and also when a can is filled to perform its detecting function, the combination therewith of an automatic stop motion comprising means including a shiftable member movable into and out of positions for connecting and disconnecting the power from the driving means of said head, spring means acting on the shiftable member tending to move it into a power-disconnecting position to effect stoppage of said head, latch means acting to restrain the shiftable member from movement by said spring means and to releasably secure the shiftable member in a manually set position for connecting the drive of said head and its fiber-working units or deliveries with the source of power, a light-sensitive electronic relay mechanism for controlling the release of said latch means and incorporating a photoelectric cell or phototube electrically connected in the electronic circuit of said relay mechanism, a light source arranged to direct a normally uninterrupted beam of light across the span occupied by the fiber-working units or deliveries of said head upon said photoelectric cell or phototube, independently movable drop flag target means operatively connected with said spoons and maintained thereby in a raised position when the spoons are engaged by a sliver but adapted to move by gravity into the path of said light beam to interrupt said beam passing to said photoelectric cell or phototube from said light source on the breaking or running out of a sliver whereby the spoon normally engaged by such sliver is caused to move into a detecting position, independently elevatable flag target means associated with each fiber-working unit or delivery and operatively connected to the trumpet holder detector lever thereof and responsive to the lifting movement of said lever when performing its detecting function for movement into a position to interrupt said light beam passing to said photoelectric cell or phototube when any of the trumpet holder detector levers is raised in the performance of its detecting function, and means including a solenoid responsive to the operation of said light-sensitive electronic relay mechanism and operatively arranged to trip said latch means for releasing the shiftable member whereby the shiftable member is caused to shift under the influence of said spring means into a position to bring about disconnection of the power from the driving means of said head and its associated fiber-working units or deliveries whenever said light beam is interrupted.

7. In a textile drawing frame having a belt-driven head with tight and loose pulley driving means and incorporating a plurality of individual fiber-working units or deliveries each having sliver detecting spoons independently movable into and out of a detecting position and drafting instrumentalities and a coiler mechanism including a movable trumpet holder detector lever operatively arranged for movement by being lifted into a position under coiling conditions of increased sliver tension and also when a can is filled to perform its detecting function, the combination therewith of an automatic stop motion comprising shiftable means including a belt-shipper member slidable on the machine into and out of positions for shifting the driving belt into and out of engagement with the tight-pulley drive of said head, spring means acting on said shiftable means tending to move it into a position to effect sliding movement of the belt-shipper member and cause it to shift the driving belt from the tight to the loose pulley to effect stoppage of the head, latch means acting to restrain the shiftable means from movement by said spring means and to releasably secure the shiftable means in a manually set position for engaging the driving belt with the tight-pulley drive of the head, a light-sensitive electronic relay mechanism for controlling the release of said latch means and incorporating a photoelectric cell or phototube electrically connected in the electronic circuit of said relay mechanism, a light source arranged to direct a normally uninterrupted beam of light across the span occupied by the fiber-working units or deliveries of said head upon said photoelectric cell or phototube, independently movable drop flag targets operatively connected with said spoons and maintained thereby in a raised position when the spoons are engaged by a sliver but adapted to move by gravity into the path of said light beam to interrupt said beam passing to said photoelectric cell or phototube from said light source on the breaking or running out of a sliver whereby the spoon normally engaged by such sliver is caused to move into a detecting position, independently elevatable flag targets one associated with each fiber-working unit or delivery and operatively connected to the trumpet holder detector lever thereof and responsive to the lifting movement of said lever when performing its detecting function for movement into a position to interrupt said light beam passing to said photoelectric cell or phototube when any of the trumpet holder detector levers is raised in the performance of its detecting function, and means including a solenoid responsive to the operation of said light-sensitive electronic relay mechanism and operatively arranged to trip said latch means for releasing the shiftable means to effect shifting thereof by said spring means to bring about sliding movement of the belt-shipper member to shift the driving belt from the tight to the loose pulley to stop the fiber-working units or deliveries of said head whenever said light beam is interrupted by a flag target.

8. In a drawing frame for textile fibers having a head incorporating a plurality of separate fiber-working units or deliveries each having its own drafting instrumentalities with a series of independently movable sliver detector spoons ahead of the drafting instrumentalities and a coiler mechanism following the drafting instrumentalities and including a movable trumpet holder detector lever operatively arranged for movement by being lifted into a position under coiling conditions of increased sliver tension and when a full can of coiled drawn sliver is reached to perform its detecting function, and having shiftable spring-operated power-disconnecting means releasable to move automatically from a manually set power-connecting position with the drive of said head into a second position operative to effect stoppage of the drive of said head, the combination therewith of a light-sensitive electronic relay mechanism including a photoelectric cell or phototube electrically connected in the electric circuit thereof, a light source arranged to direct a normally uninterrupted beam of light across the span occupied by the plurality of fiber-working units or deliveries upon said photoelectric cell or phototube, a series of pivoted levers operably connected to said spoons and independently swingable in corresponding parallel planes, each of said levers having an arm portion carrying a target element which is maintained in a raised position when the associated spoon is engaged by a sliver but adapted to swing into the path of said light beam to interrupt said beam passing to said photoelectric cell or phototube from said light source on the breaking or running out of a sliver engaging such spoon whereby the said spoon becomes free to move into a detecting position, a second series of pivoted levers independently swingable in parallel planes one of such levers with each fiber-working unit or delivery and operatively connected to the trumpet holder detector lever thereof, each of said last-named pivoted levers having an elevatable arm portion carrying a target element which is caused to assume a raised position across the path of said light beam to interrupt said beam passing to said photoelectric cell or phototube from said light source on the lifting movement of said trumpet holder detector lever in the performance of its detecting function, and means including a solenoid electrically connected with said light-sensitive electronic relay mechanism and responsive to the operation thereof to initiate the release and operation of the shiftable spring-operated power-disconnecting means to bring about stoppage of the drive of the head and its associated fiber-working units or deliveries whenever said light beam is interrupted by a target element and the rays of said beam blocked in their passage to said photoelectric cell or phototube from the light source.

9. Control apparatus for a spring-actuated belt-shipper mechanism for a textile drawing frame comprising: a series of sliver detector spoons each fulcrumed for independent rocking movement and normally held in a balanced position by the weight and tension of a sliver in engagement with said spoon, a series of pivoted levers independently swingable on a common supporting member and each having two arms one of which has pivotal engagement at its outer end with the outer end of said spoon, the other arm of said lever being provided at its outer end with an enlargement which forms a flag target, a plurality of movable trumpet holder detector levers one associated with each delivery of the frame and operatively arranged for movement by being lifted into a raised position in the performance of its detecting functions under coiling conditions of excess sliver tension and whenever a can associated with the coiler part of the frame is filled, a second series of pivoted levers independently swingable in parallel planes on a common supporting member one of such levers being associated with each delivery of the frame and operatively connected to the trumpet holder detector lever thereof, each of said second series of pivoted levers having an elevatable arm portion carrying a flag target element, a photoelectric device, a light source arranged to direct a normally uninterrupted beam of light upon said photoelectric device, and control circuits including a thyratron tube and a pair of relays electrically connected with said phototube device and responsive to the operation thereof, an electric circuit, one of said relays in said circuit and maintained normally energized by said control circuits and with its armature in open circuit position to maintain a second electric circuit open and the other of said relays deenergized, and a solenoid-operated latch device in series with said second relay and arranged to be tripped to initiate the automatic operation of said spring-actuated belt-shipper mechanism upon energization of said second relay on closing of the second electric circuit in response to the operation of said photoelectric device upon interruption by a flag target of the light rays beamed from said light source upon said photoelectric device due to a change in position of the flag target in response to detecting movements of a spoon or a trumpet holder lever and their respective associated target levers.

FAUSTO G. DE SANTIS.
ELLIS H. WILCOX.

References Cited in the file of this patent

UNITED STATES PATENTS

| Number | Name | Date |
|---|---|---|
| 173,888 | Boyden et al. | Feb. 22, 1876 |
| 534,992 | Brady et al. | Mar. 5, 1895 |
| 767,965 | Scott | Aug. 16, 1904 |
| 1,047,479 | Aldrich | Dec. 17, 1912 |
| 1,090,586 | Willey et al. | Mar. 17, 1914 |
| 1,980,294 | Ross et al. | Nov. 13, 1934 |
| 2,233,483 | Metcalf | Mar. 4, 1941 |
| 2,389,625 | Lambach et al. | Nov. 27, 1945 |
| 2,557,533 | Corl | June 19, 1951 |